(12) United States Patent
Zhang et al.

(10) Patent No.: US 12,339,175 B2
(45) Date of Patent: Jun. 24, 2025

(54) TEMPERATURE MEASUREMENT CIRCUIT AND METHOD

(71) Applicant: Lemon Inc., Grand Cayman (KY)

(72) Inventors: Chuang Zhang, Los Angeles, CA (US); Shan Lu, Los Angeles, CA (US); Junmou Zhang, Los Angeles, CA (US); Yimin Chen, Los Angeles, CA (US); Jian Wang, Beijing (CN); Yuanlin Cheng, Beijing (CN)

(73) Assignee: Lemon Inc., Grand Cayman (KY)

( * ) Notice: Subject to any disclaimer, the term of this patent is extended or adjusted under 35 U.S.C. 154(b) by 548 days.

(21) Appl. No.: 17/736,157

(22) Filed: May 4, 2022

(65) Prior Publication Data

US 2022/0357215 A1   Nov. 10, 2022

(30) Foreign Application Priority Data

May 7, 2021   (CN) .......................... 202110496105.0

(51) Int. Cl.
*G01K 15/00*   (2006.01)
*G01K 7/00*   (2006.01)
*G01K 7/20*   (2006.01)

(52) U.S. Cl.
CPC ........... *G01K 7/203* (2013.01); *G01K 15/005* (2013.01); *G01K 7/20* (2013.01)

(58) Field of Classification Search
CPC ........ G01K 15/005; G01K 7/203; G01K 7/01; G01K 1/20; G01K 2219/00

(Continued)

(56) References Cited

U.S. PATENT DOCUMENTS 5,068,595 A * 11/1991 Kearney ................. G05F 3/225
                                                        327/512
5,774,013 A *  6/1998 Groe ....................... G05F 3/262
                                                        327/539

(Continued)

FOREIGN PATENT DOCUMENTS

CN       109060162 A  * 12/2018  ............... G01K 7/32
DE   102007008226 A1 *  9/2008  ........... G01K 15/005

(Continued)

OTHER PUBLICATIONS

17736157_2024-09-16_JP_2008256694_A_H.pdf,Oct. 23, 2008.*

(Continued)

*Primary Examiner* — Gail Kaplan Verbitsky
(74) *Attorney, Agent, or Firm* — Faegre Drinker Biddle & Reath LLP

(57) ABSTRACT

Disclosed are a temperature measurement circuit and method. The circuit includes a first temperature sensing circuit, a second temperature sensing circuit and a data processing unit. The first temperature sensing circuit is configured to generate a first measurement signal for characterizing a temperature based on an inputted first current signal, a magnitude of the first current signal being correlated to temperature. The second temperature sensing circuit is configured to generate a second measurement signal for characterizing the temperature based on an inputted second current signal, the second current signal being independent of temperature. The data processing unit is configured to determine a current temperature based on a first characteristic parameter corresponding to the first measurement signal and a second characteristic parameter corresponding to the second measurement signal.

17 Claims, 2 Drawing Sheets

(58) Field of Classification Search
USPC ........ 374/1, 183, 100; 327/512, 513; 331/57
See application file for complete search history.

(56) References Cited

U.S. PATENT DOCUMENTS

| | | | | |
|---|---|---|---|---|
| 5,899,570 | A * | 5/1999 | Darmawaskita | G01K 7/203 |
| | | | | 377/25 |
| 7,225,099 | B1 | 5/2007 | O'Dwyer | |
| 7,573,340 | B2 * | 8/2009 | Lee ........................ | G01K 7/346 |
| | | | | 374/170 |
| 7,961,033 | B2 * | 6/2011 | Meninger ............. | H03L 7/0816 |
| | | | | 374/170 |
| 9,234,804 | B2 * | 1/2016 | Englasyam ............ | G01K 7/015 |
| 9,261,415 | B1 * | 2/2016 | Zhang ....................... | G05F 3/16 |
| 2003/0189859 | A1 * | 10/2003 | Takahashi ............. | G11C 11/406 |
| | | | | 365/200 |
| 2006/0038626 | A1 | 2/2006 | Duval et al. | |
| 2007/0160113 | A1 | 7/2007 | Kim et al. | |
| 2009/0122834 | A1 | 5/2009 | Wang | |
| 2012/0140792 | A1 | 6/2012 | Yeh | |
| 2013/0077652 | A1 | 3/2013 | Pyo | |
| 2013/0156069 | A1 * | 6/2013 | Yun .......................... | G01K 7/32 |
| | | | | 374/170 |
| 2014/0341257 | A1 * | 11/2014 | Bernardinis ......... | G01D 5/2454 |
| | | | | 374/178 |
| 2017/0356811 | A1 * | 12/2017 | Kothandaraman ....... | G01L 1/14 |
| 2018/0149527 | A1 | 5/2018 | Lu et al. | |
| 2022/0230680 | A1 * | 7/2022 | Wu ........................... | G11C 7/04 |

FOREIGN PATENT DOCUMENTS

| | | | | |
|---|---|---|---|---|
| EP | 2295944 | A2 * | 3/2011 | ............. G01K 7/015 |
| JP | 2002117671 | A * | 4/2002 | ........... G11C 11/406 |
| JP | 3647468 | B2 * | 5/2005 | ............. G05F 3/262 |
| JP | 2008256694 | A * | 10/2008 | ........... G01K 15/005 |
| KR | 20070087516 | A * | 8/2007 | |
| TW | 200829895 | A | 7/2008 | |
| TW | 200844415 | A | 11/2008 | |
| WO | WO-9720262 | A1 * | 6/1997 | ............. G05F 3/262 |
| WO | WO-0213384 | A1 * | 2/2002 | ........... G11C 11/406 |
| WO | 2011021276 | A1 | 2/2011 | |

OTHER PUBLICATIONS

17736157_2024-09-18_CN_109060162_A_H.pdf,Jun. 5, 1997.*
17736157_2024-09-18_JP_2002117671_A_H.pdf,Apr. 19, 2002.*
17736157_2024-09-18_WO_0213384_A1_H.pdf,Feb. 14, 2002.*
17736157_2024-09-26_DE_102007008226_A1_H.pdf,Sep. 25, 2008.*
17736157_2024-09-26_EP_2295944_A2_H.pdf,Mar. 16, 2011.*
17736157_2024-09-26_JP_3647468_B2_H.pdf,May 11, 2005.*
17736157_2024-09-26_KR_20070087516_A_H.pdf,Aug. 28, 2007.*
International Search Report and Written Opinion for International Application No. PCT/SG2020/050271, mailed Aug. 12, 2022, 20 Pages.
European Search Report for EP Patent Application No. 22799220.3, Issued on Sep. 10, 2024, 19 pages.

* cited by examiner

TEMPERATURE MEASUREMENT CIRCUIT AND METHOD

CROSS REFERENCE OF RELATED APPLICATION

The present application claims priority to Chinese Patent Application No. 202110496105.0, titled "TEMPERATURE MEASUREMENT CIRCUIT AND METHOD", filed on May 7, 2021 with the National Intellectual Property Administration, PRC, which is incorporated herein by reference in its entirety.

FIELD

The present disclosure relates to the technical field of temperature measurement, and in particular to a temperature measurement circuit and a temperature measurement method.

BACKGROUND

Temperature control is generally required in circuits. However, the temperature measurement circuit using a high-end analog-to-digital converter ADC occupies a large area and is difficult to route. In addition, temperature measurement circuits have disadvantages including inaccurate temperature measurement and nonlinear performance.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

A temperature measurement circuit and a temperature measurement method are provided according to the embodiments of the present disclosure.

In a first aspect, a temperature measurement circuit is provided according to an embodiment of the present disclosure, the temperature measurement circuit includes: a first temperature sensing circuit, a second temperature sensing circuit, and a data processing unit. The first temperature sensing circuit is configured to generate a first measurement signal for characterizing temperature based on an inputted first current signal, a magnitude of the first current signal being correlated to temperature. The second temperature sensing circuit is configured to generate a second measurement signal for characterizing temperature based on an inputted second current signal, the second current signal being independent of temperature. An output terminal of the first temperature sensing circuit and an output terminal of the second temperature sensing circuit are connected to an input terminal of the data processing unit. The data processing unit is configured to determine a current temperature based on a first characteristic parameter corresponding to the first measurement signal and a second characteristic parameter corresponding to the second measurement signal. A circuit parameter of the first temperature sensing circuit is the same as a circuit parameter of the second temperature sensing circuit.

In a second aspect, a temperature measurement method applied to the data processing unit in the temperature measurement circuit in the first aspect is provided according to an embodiment of the present disclosure. The temperature measurement circuit includes the first temperature sensing circuit and the second temperature sensing circuit. The temperature measurement method includes: receiving the first measurement signal outputted by the first temperature sensing circuit and the second measurement signal outputted by the second temperature sensing circuit, where the first current signal is inputted into the first temperature sensing circuit, the magnitude of the first current signal being correlated to temperature, and the second current signal is inputted into the second temperature sensing circuit, the second current signal being independent of temperature; extracting the first characteristic parameter corresponding to the first measurement signal and the second characteristic parameter corresponding to the second measurement signal; and determining a current temperature of an environment in which the temperature measurement circuit is located based on the first characteristic parameter and the second characteristic parameter.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION

Figure 1:
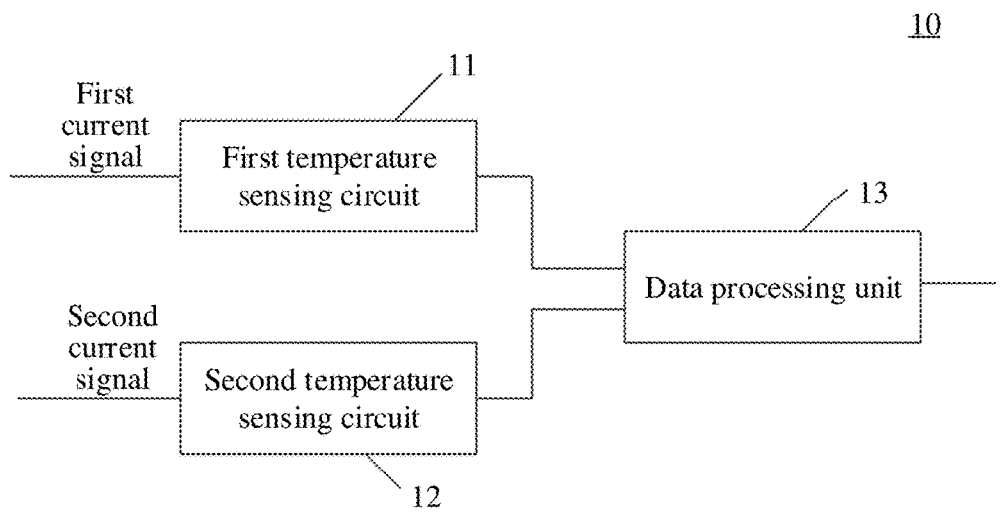
FIG. 1 is a schematic structural diagram of a temperature measurement circuit according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

Referring to FIG. 1, which is a schematic structural diagram of a temperature measurement circuit according to an embodiment of the present disclosure, a temperature measurement circuit 10 includes:

a first temperature sensing circuit 11, a second temperature sensing circuit 12, and a data processing unit 13.

The first temperature sensing circuit 11 is configured to generate a first measurement signal for characterizing temperature based on an inputted first current signal. A magnitude of the first current signal is correlated to temperature. The first measurement signal is correlated to temperature and a circuit parameter of the first temperature sensing circuit.

The second temperature sensing circuit 12 is configured to generate a second measurement signal for characterizing temperature based on an inputted second current signal. The second current signal is independent of temperature, and the second measurement signal is correlated to a circuit parameter of the second temperature sensing circuit.

An output terminal of the first temperature sensing circuit 11 and an output terminal of the second temperature sensing circuit 12 are connected to an input terminal of the data processing unit 13.

The data processing unit 13 is configured to determine a current temperature based on a first characteristic parameter corresponding to the first measurement signal and a second characteristic parameter corresponding to the second measurement signal, where the circuit parameter of the first temperature sensing circuit is the same as the circuit parameter of the second temperature sensing circuit.

In some application scenarios, the temperature measurement circuit is applicable in integrated circuit design to detect the temperature of the integrated circuit during operation. In these application scenarios, the temperature measurement circuit may be a temperature detection circuit module fixedly arranged in the integrated circuit.

The first measurement signal may be a first periodic oscillation signal, and the first characteristic parameter may be, for example, a first frequency of the first periodic oscillation signal.

The second measurement signal may be a second periodic oscillation signal, and the second characteristic parameter is a second frequency of the second periodic oscillation signal.

The first frequency may be correlated to the current temperature and the circuit parameter of the first temperature sensing circuit, and the second frequency may be correlated to the circuit parameter of the second temperature sensing circuit.

The circuit parameter of the first temperature sensing circuit is the same as the circuit parameter of the second temperature sensing circuit. For example, the same components required by the first temperature sensing circuit and the second temperature sensing circuit may be fabricated by using the same fabrication process.

Since the circuit parameter of the first temperature sensing circuit 11 is the same as the circuit parameter the second temperature sensing circuit 12, for inputted current signals, an output signal generated by the first temperature sensing circuit based on the circuit parameter thereof in response to the inputted first current signal is approximately identical to an output signal generated by the second temperature sensing circuit based on the circuit parameter thereof in responsive to the inputted second current signal.

An output signal that is generated due to the circuit parameter of the first temperature sensing circuit in response to the first current signal is removed from the first measurement signal by using the second measurement signal generated by the second temperature sensing circuit in response to the second current signal. The remaining part of the first measurement signal is related to only the first current signal that is correlated to temperature. Therefore, the remaining part of the first measurement signal may be regarded as being correlated to only temperature, and may be used for determining the temperature of the environment in which the temperature measurement circuit is located.

In the temperature measurement circuit according to the embodiment of the present disclosure, the first temperature sensing circuit and the second temperature sensing circuit that have the same circuit parameter are provided, and the first current signal and the second current signal are respectively inputted into the first temperature sensing circuit and the second temperature sensing circuit, the magnitude of the first current signal being correlated to temperature, and the magnitude of the second current signal being independent of temperature. The influence due to the circuit parameter of the first temperature sensing circuit on the first measurement signal outputted by the first temperature sensing circuit is eliminated by using the second measurement signal outputted by the second temperature sensing circuit, so that the temperature obtained by using the temperature measurement circuit has better linearity and higher accuracy, that is, temperature measurement results generated by the above temperature measurement circuit have better linearity and higher accuracy.

Figure 2:
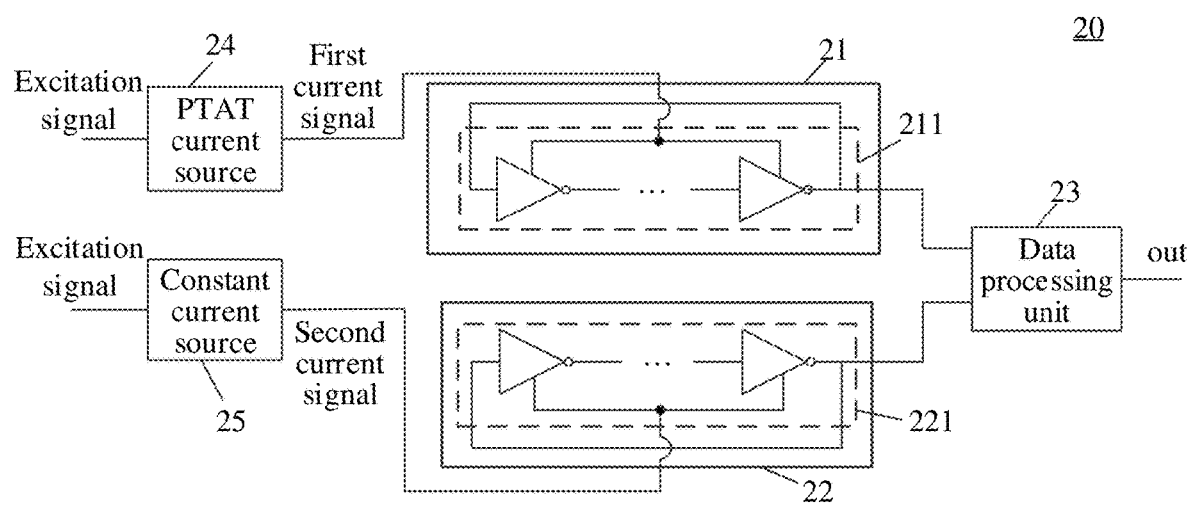
FIG. 2 is a schematic structural diagram of a temperature measurement circuit according to another embodiment of the present disclosure.

Reference is made to FIG. 2, which is a schematic structural diagram of a temperature measurement circuit according to another embodiment of the present disclosure.

Compared with the embodiment shown in FIG. 1, as shown in FIG. 2, a temperature measurement circuit 20 includes a first temperature sensing circuit 21, a second temperature sensing circuit 22, a data processing unit 23, a PTAT current source 24, and a constant current source 25.

The PTAT (Proportional To Absolute Temperature) current source 24 refers to a current source whose output current having an magnitude that is positively proportional to absolute temperature (unit: Kelvin).

That is, the relationship between a magnitude I (unit: ampere) of a current outputted by the PTAT current source 24 and a temperature T (unit: Kelvin) of an environment where the PTAT current source 24 is located satisfies $I = A \times T$, where A is a fixed constant. The current output by the PTAT current source 24 may be referred to as a PTAT current. The PTAT current source 24 herein may be implemented by various existing PTAT current source circuits.

In some application scenarios, in a case that the temperature measurement circuit is applied for measurement in integrated circuits, the PTAT current source 24 may be provided in an integrated circuit. The PTAT current source 24 may be provided in the integrated circuit in the form of a sub-circuit, as the core unit of the temperature sensor. Since the output current of the PTAT current source 24 is positively proportional to absolute temperature, the current environment temperature may be reflected by the magnitude of the output current of the PTAT current source 24 through a certain mechanism.

The PTAT current source 24 is configured to generate a first current signal having a magnitude varying with temperature.

An output terminal of the PTAT current source 24 is connected to an input terminal of the first temperature sensing circuit, to input the first current signal into the first temperature sensing circuit.

The constant current source 25 may include a PTAT current source and a CTAT (Complementary to Absolute Temperature) circuit. The CTAT circuit has a negative temperature coefficient. That is, a magnitude of a current produced by the CTAT circuit is negatively correlated to temperature. In some application scenarios, the constant current source may include the PTAT current source 24 and a CTAT circuit. For example, the first current signal outputted by the PTAT current source is inputted into the CTAT circuit, and the CTAT circuit outputs a second current signal that does not vary with the temperature.

The CTAT circuit in this embodiment may be implemented by various existing CTAT circuits.

The PTAT current source 24 outputs the first current signal that is positively correlated with temperature under the excitation of a voltage signal.

The CTAT circuit outputs a calibration current signal for calibration that is negatively correlated the temperature under the excitation of a voltage signal.

A first weight and a second weight may be assigned to the calibration current signal and the first current signal, respectively. The second current signal is determined by a product of the calibration signal and the first weight and a product of the first current signal and the second weight. For example, a sum of the product of the calibration signal and the first weight and the product of the first current signal and the second weight is used as the second current signal.

Through the PTAT current source 24 and the CTAT circuit, a constant current signal (the second current signal) that does not vary with temperature may be obtained.

The second temperature sensing circuit may be a duplicate of the first temperature sensing circuit. Specifically, a circuit structure of the second temperature sensing circuit may be the same as that of the first temperature sensing circuit. An element parameter of each element used in the circuit structure of the second temperature sensing circuit may be the same as an element parameter of a corresponding one of the elements in the circuit structure of the first temperature sensing circuit.

In an embodiment, the first temperature sensing circuit 21 includes a first ring oscillator 211. The second temperature sensing circuit 22 includes a second ring oscillator 221. A signal input terminal of the first ring oscillator 211 is connected to the output terminal of the PTAT current source 24. A signal input terminal of the second ring oscillator 221 is connected to the output terminal of the constant current source 25.

Each of the first ring oscillator 211 and the second ring oscillator 221 includes an odd number of inverters. The first ring oscillator 211 and the second ring oscillator 221 include the same number of inverters. Further, a parameter of each inverter in the first ring oscillator may be the same as a parameter of a corresponding one of the inverters in the second ring oscillator. The parameter of the inverter herein may include, for example, a capacitance of a capacitor.

The first ring oscillator 211 may generate a first oscillation current signal based on the inputted first current signal. The first oscillation current signal here may be the first measurement signal. The first oscillation current signal is a first periodic oscillation signal. A frequency of the first periodic oscillation signal may be correlated to the magnitude of the first current signal.

The second ring oscillator 221 may generate a second oscillation current signal based on the inputted second current signal. The second oscillation current signal here may be the second measurement signal. An oscillation frequency of the second oscillation current signal may be correlated to the second current signal.

The second current signal may be generated by the constant current source 25. In some application scenarios, the same excitation signal may be inputted into a signal input terminal of the PTAT current source 24 and a signal input terminal of the constant current source 25. In other application scenarios, the PTAT current source constituting the constant current source may be a duplicate of the PTAT current source that generates the first current signal.

In other application scenarios, the constant current source may include the PTAT current source that generates the first current signal and a CTAT circuit. That is, in these application scenarios, the second current signal may be generated by the CTAT circuit based on the inputted first current signal.

In the above two application scenarios, the relationship between the second current signal and the first current signal may be expressed by the following equation:

where the first current signal generated by the PTAT current source may be represented by Iptat, the current signal generated by the constant current source may be represented by Iabs, $$I\text{ptat}=a \times T \tag{1},$$

where a is a constant, and T is absolute temperature.

The relationship between the second current signal and the first current signal may be expressed by the following equation:

$$I\text{abs}=I\text{ptat}+\Delta I\text{ptat} \tag{2},$$ where

ΔIptat is a difference between Iptat and Iabs. Since Iabs does not vary with temperature, while Iptat varies with temperature, ΔIptat varies with temperature.

The first characteristic parameter (that is, the first oscillation frequency) of the first measurement signal outputted by the first ring oscillator 211 under the action of the first current signal may be expressed by the following equation:

$$F1=F\text{abs}+b \times \Delta I\text{ptat} \tag{3},$$ where b is a constant.

The second characteristic parameter (that is, the second oscillation frequency) of the second measurement signal outputted by the second ring oscillator 221 under the action of the second current signal may be represented by Fabs.

$$F2=F\text{abs} \tag{4}$$

A temperature measurement frequency F3 may be obtained by subtracting the equation (3) from the equation (4):

$$F3=F1-F2=b \times \Delta I\text{ptat}=b \times a' \times T=b' \times T \tag{5}.$$

The temperature is determined by using equation (5), so as to eliminate the effect of the circuit parameter of the ring oscillator on the result, thereby improving the linearity of the measurement result.

In practice, a relationship curve between temperature and the temperature measurement frequency F3 may be first obtained by calibration according to equation (5), and the value of b' may be determined. When actually measuring temperature, the current temperature T may be determined based on the temperature measurement frequency F3 outputted by the temperature measurement circuit.

In the temperature measurement circuit according to this embodiment, the PTAT current source and the constant current source are provided in the temperature measurement circuit, the PTAT current is inputted into the first ring oscillator to obtain the first measurement signal, and the second current signal outputted by the constant current source is inputted into the second ring oscillator to obtain the second measurement signal, the first oscillation frequency is determined based on the first measurement signal, the second oscillation frequency is determined based on the second measurement signal, the temperature measurement frequency that is correlated to only the temperature is extracted from the first oscillation frequency by using the second oscillation frequency, and the temperature measurement frequency is used to determine temperature, so as to obtain a more accurate measurement result.

Figure 3:
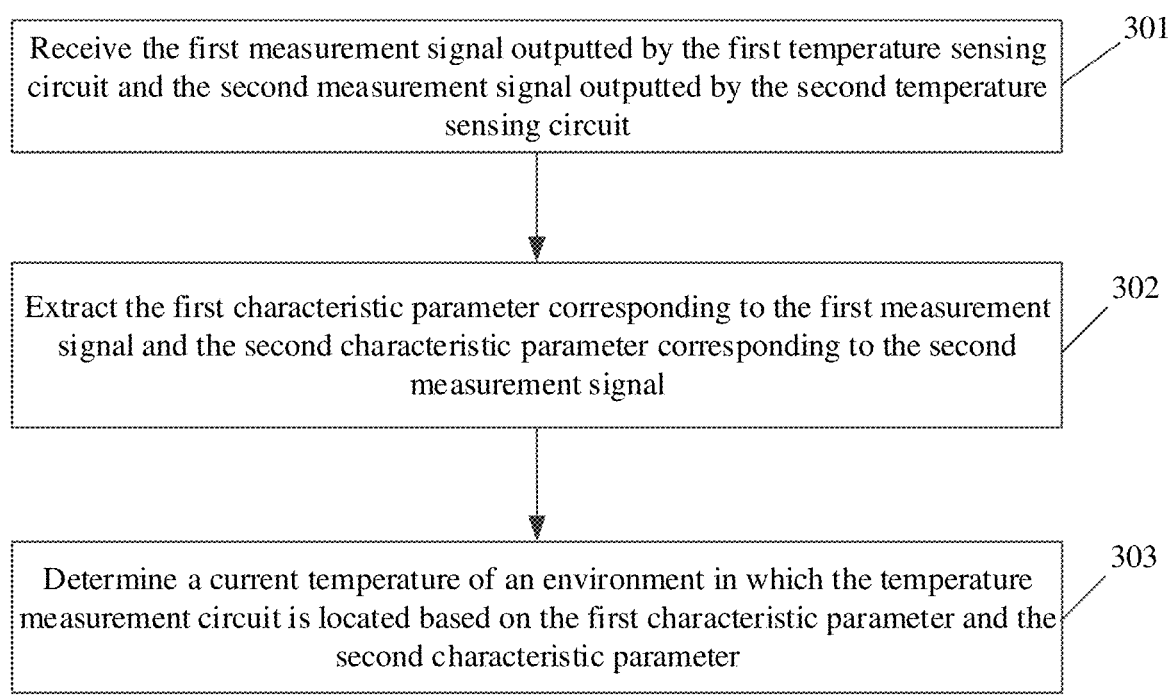
FIG. 3 is a flow char of a temperature measurement method according to an embodiment of the present disclosure.

Reference is made to FIG. 3, which is a flow char of a temperature measurement method according to an embodiment of the present disclosure. The temperature measurement method is applied to the data processing unit in the temperature measurement circuit shown in FIG. 1.

The temperature measurement circuit includes the first temperature sensing circuit and the second temperature sensing circuit. The temperature measurement method includes the following steps 301 to 303.

In step 301, the first measurement signal outputted by the first temperature sensing circuit and the second measurement signal outputted by the second temperature sensing circuit are received.

The first current signal is inputted into the first temperature sensing circuit, the magnitude of the first current signal being correlated to temperature. The first measurement signal is correlated to temperature and a circuit parameter of the first temperature sensing circuit.

The second current signal is inputted into the second temperature sensing circuit. The second current signal is independent of temperature, and the second measurement signal is correlated to a circuit parameter of the second temperature sensing circuit.

Each circuit parameter of the first temperature sensing circuit is the same as a corresponding one of circuit parameters of the second temperature sensing circuit.

In step 302, the first characteristic parameter corresponding to the first measurement signal and the second characteristic parameter corresponding to the second measurement signal are extracted.

In step 303, a current temperature of an environment in which the temperature measurement circuit is located is determined based on the first characteristic parameter and the second characteristic parameter.

Specifically, a part of the first characteristic parameter that is the same as the second characteristic parameter may be extracted from the first characteristic parameter, and the current temperature of the environment in which the temperature measurement circuit is located may be determined based on the remaining part of the first characteristic parameter.

The remaining part of the first characteristic parameter, which is also referred to as a partial characteristic parameter, here is correlated to only temperature.

In some application scenarios, the temperature measurement circuit includes the PTAT current source and the constant current source. The first temperature sensing circuit includes the first ring oscillator, and the second temperature sensing circuit includes the second ring oscillator. The signal input terminal of the first ring oscillator is connected to the output terminal of the PTAT current source, and the signal input terminal of the second ring oscillator is connected to the output terminal of the constant current source.

The first ring oscillator and the second ring oscillator include the same number of inverters. Each of the first ring oscillator and the second ring oscillator includes an odd number of inverters. The second ring oscillator may be a mirror of the first ring oscillator.

A parameter of each inverter of the first ring oscillator is the same as a parameter of a corresponding one of the inverters of the second ring oscillator.

The first measurement signal may a first periodic oscillation signal outputted by the first ring oscillator, and the second measurement signal may be a second periodic oscillation signal outputted by the second ring oscillator. Each of the first periodic oscillation signal and the second periodic oscillation signal is a periodic pulse signal. The above step 302 may include: extracting a first oscillation frequency of the first measurement signal as the first characteristic parameter, and extracting a second oscillation frequency of the second measurement signal as the second characteristic parameter.

The first oscillation frequency may be correlated to temperature and a circuit parameter of the first ring oscillator.

The second oscillation frequency may be correlated to a circuit parameter of the second ring oscillator.

The circuit parameter of the first ring oscillator is the same as the circuit parameter of the second ring oscillator. The first ring oscillator and the second ring oscillator include the same number of inverters. Each of the first ring oscillator and the second ring oscillator includes an odd number of inverters.

In these application scenarios, the above step 330 further includes the following steps.

First, a partial characteristic parameter that is correlated to only temperature is extracted from the first characteristic parameter by using the second characteristic parameter.

Next, the current temperature is determined by using the partial characteristic parameter that is correlated to only temperature.

Specifically, the first current signal generated by the PTAT current source may be represented by Iptat, and the current signal generated by the constant current source may be represented by Iabs, $$I\text{ptat} = a \times T \quad (6),$$

where a is a constant, and T is absolute temperature.

The relationship between the second current signal and the first current signal may be expressed by the following equation:

$$I\text{abs} = I\text{ptat} + \Delta I\text{ptat} \quad (7),$$ where

ΔIptat is a difference between Iptat and Iabs. Since Iabs does not vary with temperature, while Iptat varies with temperature, ΔIptat varies with temperature.

The first characteristic parameter (that is, the first oscillation frequency) of the first measurement signal outputted by the first ring oscillator under the action of the first current signal may be expressed by the following equation:

$$F1 = F\text{abs} + b \times \Delta I\text{ptat} \quad (8),$$ where b is a constant.

The second characteristic parameter (that is, the second oscillation frequency) of the second measurement signal outputted by the second ring oscillator under the action of the second current signal may be represented by Fabs.

$$F2=F\text{abs} \tag{9}$$

A temperature measurement frequency F3 may be obtained by subtracting the equation (8) from the equation (9):

$$F3=F1-F2=b\times \Delta I\text{ptat}=b\times a'\times T=b'\times T \tag{10}.$$

The temperature is determined by using equation (10), so as to eliminate the effect of the circuit parameter of the ring oscillator on the result, thereby improving the linearity of the measurement result.

In practice, a relationship curve between temperature and the temperature measurement frequency F3 may be first obtained by calibration according to equation (10), and the value of b' may be determined. When actually measuring temperature, the current temperature T of the environment in which the temperature measurement circuit is located may be determined based on the temperature measurement frequency outputted by the temperature measurement circuit.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A temperature measurement circuit, comprising: a first temperature sensing circuit, a second temperature sensing circuit, a data processing unit, a PTAT (Proportional To Absolute Temperature) current source whose output current having a magnitude that is positively proportional to absolute temperature and a constant current source, wherein the first temperature sensing circuit is configured to generate a first measurement signal for characterizing temperature based on an inputted first current signal, a magnitude of the first current signal being correlated to temperature;

the second temperature sensing circuit is configured to generate a second measurement signal for characterizing temperature based on an inputted second current signal, the second current signal being independent of temperature;

an output terminal of the first temperature sensing circuit and an output terminal of the second temperature sensing circuit are connected to an input terminal of the data processing unit;

the data processing unit is configured to determine a current temperature based on a first characteristic parameter corresponding to the first measurement signal and a second characteristic parameter corresponding to the second measurement signal, wherein a circuit parameter of the first temperature sensing circuit is the same as a circuit parameter of the second temperature sensing circuit;

the PTAT current source is configured to generate the first current signal having a magnitude varying with temperature, the constant current source is configured to generate a second current source having a constant magnitude;

an output terminal of the PTAT current source is connected to an input terminal of the first temperature sensing circuit; and an output terminal of the constant current source is connected to an input terminal of the second temperature sensing circuit.

2. The temperature measurement circuit according to claim 1, wherein the first measurement signal is correlated to temperature and the circuit parameter of the first temperature sensing circuit; and the second measurement signal is correlated to the circuit parameter of the second temperature sensing circuit.

3. The temperature measurement circuit according to claim 1, wherein the constant current source comprises the PTAT current source and an absolute temperature compensation circuit.

4. The temperature measurement circuit according to claim 1, wherein the first temperature sensing circuit comprises a first ring oscillator, and the second temperature sensing circuit comprises a second ring oscillator;

a signal input terminal of the first ring oscillator is connected to the output terminal of the PTAT current source;

a signal input terminal of the second ring oscillator is connected to the output terminal of the constant current source.

5. The temperature measurement circuit according to claim 4, wherein the first measurement signal is a first periodic oscillation signal generated by the first ring oscillator based on the first current signal;

the second measurement signal is a second periodic oscillation signal generated by the second ring oscillator based on the second current signal, the first characteristic parameter is a first oscillation frequency, and the second characteristic parameter is a second oscillation frequency; and the data processing unit is configured to determine the current temperature based on the first oscillation frequency of the first period oscillation signal and the second oscillation frequency of the second period oscillation signal.

6. The temperature measurement circuit according to claim 4, wherein each of the first ring oscillator and the second ring oscillator comprises an odd number of inverters.

7. The temperature measurement circuit according to claim 6, wherein the first ring oscillator and the second ring oscillator comprise the same number of inverters.

8. The temperature measurement circuit according to claim 1, wherein the second temperature sensing circuit is a mirror circuit of the first temperature sensing circuit.

9. A temperature measurement method applied to the data processing unit in the temperature measurement circuit according to claim 1, the temperature measurement circuit comprising the first temperature sensing circuit, the second temperature sensing circuit, a PTAT (Proportional To Absolute Temperature) current source whose output current having a magnitude that is positively proportional to absolute temperature and a constant current source, and the temperature measurement method comprises:

receiving the first measurement signal outputted by the first temperature sensing circuit and the second measurement signal outputted by the second temperature sensing circuit, wherein the first current signal is inputted into the first temperature sensing circuit, the magnitude of the first current signal being correlated to temperature, and the second current signal is inputted into the second temperature sensing circuit, the second current signal being independent of temperature;

extracting the first characteristic parameter corresponding to the first measurement signal and the second characteristic parameter corresponding to the second measurement signal; and determining a current temperature of an environment in which the temperature measurement circuit is located based on the first characteristic parameter and the second characteristic parameter;

wherein the PTAT current source is configured to generate the first current signal having a magnitude varying with temperature, the constant current source is configured to generate a second current source having a constant magnitude;

an output terminal of the PTAT current source is connected to an input terminal of the first temperature sensing circuit; and an output terminal of the constant current source is connected to an input terminal of the second temperature sensing circuit.

10. The method according to claim 9, wherein
the first measurement signal is correlated to temperature and the circuit parameter of the first temperature sensing circuit; and
the second measurement signal is correlated to the circuit parameter of the second temperature sensing circuit.

11. The method according to claim 9, wherein the constant current source comprises the PTAT current source and an absolute temperature compensation circuit.

12. The method according to claim 9, wherein the first temperature sensing circuit comprises a first ring oscillator, and the second temperature sensing circuit comprises a second ring oscillator;

a signal input terminal of the first ring oscillator is connected to the output terminal of the PTAT current source;

a signal input terminal of the second ring oscillator is connected to the output terminal of the constant current source.

13. The method according to claim 12, wherein the first measurement signal is a first periodic oscillation signal generated by the first ring oscillator based on the first current signal;

the second measurement signal is a second periodic oscillation signal generated by the second ring oscillator based on the second current signal, the first characteristic parameter is a first oscillation frequency, and the second characteristic parameter is a second oscillation frequency; and the data processing unit is configured to determine the current temperature based on the first oscillation frequency of the first period oscillation signal and the second oscillation frequency of the second period oscillation signal.

14. The method according to claim 12, wherein each of the first ring oscillator and the second ring oscillator comprises an odd number of inverters.

15. The method according to claim 14, wherein the first ring oscillator and the second ring oscillator comprise the same number of inverters.

16. The method according to claim 9, wherein the second temperature sensing circuit is a mirror circuit of the first temperature sensing circuit.

17. The method according to claim 9, wherein the temperature measurement circuit comprises a PTAT (Proportional To Absolute Temperature) current source whose output current having a magnitude that is proportional to absolute temperature and a constant current source, the first temperature sensing circuit comprises a first ring oscillator, the second temperature sensing circuit comprises a second ring oscillator, a signal input terminal of the first ring oscillator is connected to an output terminal of the PTAT current source, a signal input terminal of the second ring oscillator is connected to an output terminal of the constant current source, the first measurement signal is a first periodic oscillation signal, and the second measurement signal is a second periodic oscillation signal, the extracting the first characteristic parameter corresponding to the first measurement signal and the second characteristic parameter corresponding to the second measurement signal comprises:

extracting a first oscillation frequency of the first periodic oscillation signal as the first characteristic parameter, and extracting a second oscillation frequency of the second periodic oscillation signal as the second characteristic parameter; and the determining a current temperature of an environment in which the temperature measurement circuit is located based on the first characteristic parameter and the second characteristic parameter comprises:

extracting a partial characteristic parameter that is correlated to only temperature from the first characteristic parameter by using the second feature parameter; and determining the current temperature by using the partial characteristic parameter that is correlated to only temperature.

* * * * *